(12) United States Patent
Raghavan et al.

(10) Patent No.: US 10,102,112 B2
(45) Date of Patent: Oct. 16, 2018

(54) METHOD AND SYSTEM FOR GENERATING TEST STRATEGY FOR A SOFTWARE APPLICATION

(71) Applicant: Wipro Limited, Bangalore (IN)

(72) Inventors: Girish Raghavan, Chennai (IN);
Selvan Nagaraja, Bangalore (IN);
Ganesh Narayan, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 181 days.

(21) Appl. No.: 15/002,657

(22) Filed: Jan. 21, 2016

(65) Prior Publication Data

US 2017/0161178 A1  Jun. 8, 2017

(30) Foreign Application Priority Data

Dec. 7, 2015 (IN) .......................... 6533/CHE/2015

(51) Int. Cl.
*G06F 11/36* (2006.01)
(52) U.S. Cl.
CPC ................ *G06F 11/3684* (2013.01)
(58) Field of Classification Search
CPC .......... G06F 11/3672; G06F 11/3684
See application file for complete search history.

(56) References Cited

U.S. PATENT DOCUMENTS

| 5,495,571 | A * | 2/1996 | Corrie, Jr. | G06F 11/3684 714/38.1 |
| 6,698,012 | B1 * | 2/2004 | Kossatchev | G06F 11/3684 714/E11.208 |
| 6,701,514 | B1 * | 3/2004 | Haswell | G06F 11/3664 707/999.102 |
| 8,429,614 | B2 * | 4/2013 | Zhang | G06F 11/3684 714/37 |
| 8,751,134 | B2 | 6/2014 | Gawnade et al. | |
| 9,032,360 | B1 * | 5/2015 | Cohen | G06F 11/3684 717/103 |
| 9,170,925 | B1 * | 10/2015 | Cohen | G06F 11/3684 |
| 2002/0083213 | A1 * | 6/2002 | Oberstein | G06F 11/3684 719/313 |
| 2004/0015865 | A1 * | 1/2004 | Cirone | G06F 11/3684 717/124 |

(Continued)

FOREIGN PATENT DOCUMENTS

WO  WO 03/015056  2/2003

*Primary Examiner* — Ziaul A Chowdhury
(74) *Attorney, Agent, or Firm* — Finnegan, Henderson, Farabow, Garrett & Dunner, LLP

(57) ABSTRACT

The present disclosure relates to a method for generating test strategy for a software application. The test strategy generation system receives a plurality of parameters from internal and external data sources and determines one or more behavioral patterns for the plurality of parameters of the external data sources. The test strategy generation system calculates a score for the plurality of parameters of external and internal data sources based on a corresponding weightage value and one or more behavioral patterns and compares an aggregate score with corresponding threshold weightage value for the plurality of parameters. The test strategy generation system generates test strategy parameters based on the comparison and filters a set of test cases for the plurality of parameters from the plurality of test cases based on the test strategy parameters.

9 Claims, 5 Drawing Sheets

(56) References Cited

U.S. PATENT DOCUMENTS

| | | | | |
|---|---|---|---|---|
| 2004/0107415 A1* | 6/2004 | Melamed | ............ | G06F 11/3684 717/124 |
| 2005/0223295 A1* | 10/2005 | Hermes | ............... | G06F 11/3684 714/38.1 |
| 2006/0190771 A1* | 8/2006 | Hefner | ................ | G06F 11/3684 714/38.14 |
| 2009/0199047 A1* | 8/2009 | Vaitheeswaran | .... | G06F 11/3409 714/47.2 |
| 2009/0276705 A1* | 11/2009 | Ozdemir | ............ | G06K 9/00335 715/708 |
| 2010/0180258 A1* | 7/2010 | Takahashi | ........... | G06F 11/3616 717/124 |
| 2010/0281467 A1* | 11/2010 | Arteaga | .............. | G06F 11/3684 717/126 |
| 2012/0030651 A1* | 2/2012 | Kemmler | ............ | G06F 11/3688 717/124 |
| 2013/0326466 A1* | 12/2013 | Rachelson | .......... | G06F 11/3414 717/101 |
| 2014/0129173 A1* | 5/2014 | Kit | ........................ | G06F 11/263 702/123 |
| 2014/0201714 A1* | 7/2014 | Vaidyan | .............. | G06F 11/3668 717/124 |
| 2014/0365830 A1* | 12/2014 | Rajan | .................. | G06F 11/3684 714/38.1 |

\* cited by examiner

METHOD AND SYSTEM FOR GENERATING TEST STRATEGY FOR A SOFTWARE APPLICATION

TECHNICAL FIELD

The present subject matter is related in general to software testing, more particularly but not exclusively to a method and system for generating a test strategy for a software application.

BACKGROUND

The software industry has become one of the dynamic industries in the present day. The increasing dependency of the society on software driven systems has led the software product reliability to become one of the key factor in the industries. Major organizations in the industries are competing against each another to increase their market value while facing numerous challenges. One such challenge is the fast evolving technologies and enterprises. In order to stay competitive, each organization has to be quick in learning and implementing the new technologies to stay connected and competitive with other organizations.

The rapid influx of new technologies has thrown up new set of challenges in the current scenario. Due to the changing technical environment, the software environment is becoming complex with fragmentation in the technology front. In addition, with more number of users focussing on and adapting to agile methodology, the overall time for an application under development is condensing. These methodology demands for testing the application to ensure quality within a reduced cycle time for the applications. The existing testing approach follows an inward focus approach, where testing software applications usually involves use of traditional primary inputs. The traditional primary inputs focuses on testing the applications based on the deterministic factors like business requirement criticality, test parameters, quality aspects etc. However, with these traditional inputs, the existing testing techniques do not cover the test scenario involving unstructured data related to the software application and also does not cover test scenarios which can help in increasing the efficiency of testing a software application.

Thus, in the existing systems, the testing techniques for the software application do not provide a test strategy which improves the efficiency of testing by considering the users experiences and other unstructured data as one of the factors in determining the test strategy. Consequently, there is a need for a test strategy which identifies the test cases for an application considering the deterministic as well as non-deterministic aspects and generating optimized test cases for a software application.

SUMMARY

Disclosed herein is a method and system for generating test strategy for a software application. Test strategy for a software application is generated by a test strategy generation module, which is connected with an external data sources and a test management system. The test strategy generation system generates an efficient test strategy for the software application based on the behavioural learning of the users of the software application.

In one embodiment, the present disclosure relates to a method for generating test strategy for a software application. The method comprises receiving, a plurality of parameters from internal and external data sources by a test strategy generation system, determining one or more behavioural patterns for the plurality of parameters of the external data sources, calculating a score for the plurality of parameters of external and internal data sources based on a corresponding weightage value and the one or more behavioural patterns, comparing an aggregate score with corresponding threshold weightage value for the plurality of parameters, wherein the aggregate score is calculated based on the score for the plurality of parameters. Based on the comparison, test strategy parameters are generated and a set of test cases for the plurality of parameters from the plurality of test cases is filtered based on the test strategy parameters.

In an embodiment, the present disclosure relates to a test strategy generation system for generating test strategy for a software application. The test strategy generation system comprises a processor and a memory communicatively coupled to the processor, wherein the memory stores processor executable instructions, which, on execution, causes the test strategy generation system to receive a plurality of parameters from internal and external data sources, determine one or more behavioural patterns for the plurality of parameters of the external data sources, calculate a score for the plurality of parameters of the external and internal data sources based on a corresponding weightage and one or more behavioural patterns, compare an aggregate score with corresponding threshold weightage value for the plurality of parameters, wherein the aggregate score is calculated based on the score for the plurality of parameters. The processor further causes the test strategy generation system to generate test strategy parameters based on the comparison. Thereafter the processor causes the test strategy-generation system to filter a set of test cases from a plurality of test cases for the plurality of parameters based on the test strategy parameters.

Furthermore, the present disclosure relates to a non-transitory computer readable medium including instructions stored thereon that when processed by at least one processor cause a test strategy generation system to receive plurality of parameters from internal and external data sources, determine one or more behavioural patterns for the plurality of parameters of the external data sources, calculate a score for the plurality of parameters of the external and internal data sources based on a corresponding weightage value and the one or more behavioural patterns, compare an aggregate score with corresponding threshold weightage value for the plurality of parameters, generate rtest strategy parameters based on the comparison and filter set of test cases for the plurality of parameters based on the test strategy parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
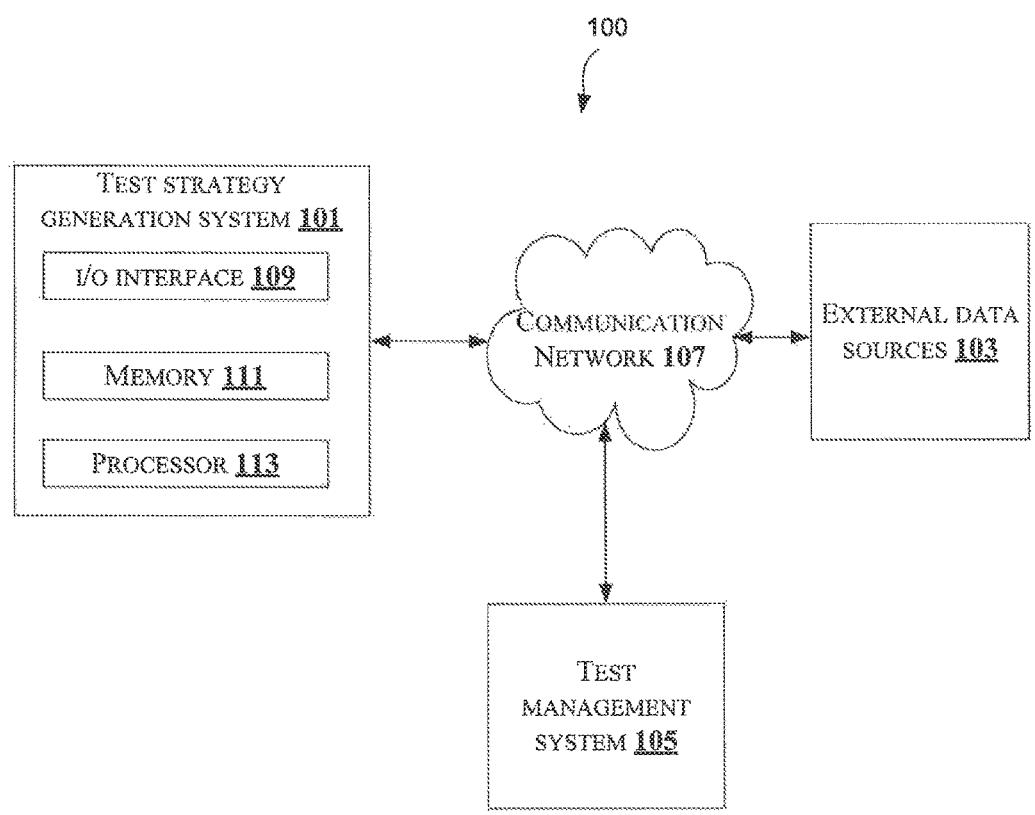
FIG. 1 shows an exemplary environment for generating a test strategy for a software application in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for generating test strategy for a software application. The method provides a test strategy which is based on the parameters gathered from external data sources in addition to the internal parameters. The present disclosure provides a test generation system which generates an efficient test strategy for a software application by considering user experiences as one of the factors. The method identifies set of test cases for the software application under test which are selected based on the behavioural learning of the user experiences and determines the preferred set of devices to be tested for a software application. In such a way, a test strategy is generated for a software application which provides efficiency in terms of higher coverage of test scenario and adds behavioural learning into the testing process of a software application.

FIG. 1 shows an exemplary environment for generating test strategy for a software application in accordance with some embodiments of the present disclosure.

As shown in FIG. 1, the environment 100 comprises a test strategy generation system 101, external data sources 103 and a test management system 105 interconnected through a wired or wireless communication network 107. The test strategy generation system 101 generates a test strategy for a software application which provides efficiency in testing the software application by covering all the aspects of test scenario for the plurality of parameters and adding behavioural analysis in the testing process. The test strategy generation system 101 takes into account internal parameters from internal data sources (not shown in figures) as well as external parameters from various external data sources 103 while determining test strategy for the software application. In an embodiment, the software application is a software product developed for users based on the demand of users or market needs. The external data sources 103 provide various external input data to the test strategy generation system 101. In an embodiment, the external data sources 103 include reports published by analysts on a particular application, data feeds from social networks, user experiences etc.

The test management system 105 includes test management tool, which helps in providing the set of test cases for the software application. In an embodiment, the test management tools can be any standard tools available in the market. Some of the test management tools available in the market are QABook™, TestLink® etc. The test strategy generation system 101 receives external parameters from the external data sources 103 and determines behavioural patterns for the external parameters and thereby determines a test strategy for the software application.

The test strategy generation system 101 comprises an I/O Interface 109, a memory 111 and a processor 113. The I/O interface 109 is configured to receive the internal parameters from the internal data sources and external parameters from the external data sources. The I/O Interface 109 also receives the set of applicable test cases for the plurality of parameters from the test management system 105. The I/O interface 109 is also configured to receive threshold weightage value for the plurality of the parameters provided by the user or pre-defined in the test strategy generation system 101.

The received information from the I/O interface 109 is stored in the memory 111. The memory 111 is communicatively coupled to the processor 113 of the test strategy generation system 101.

Figure 2A:
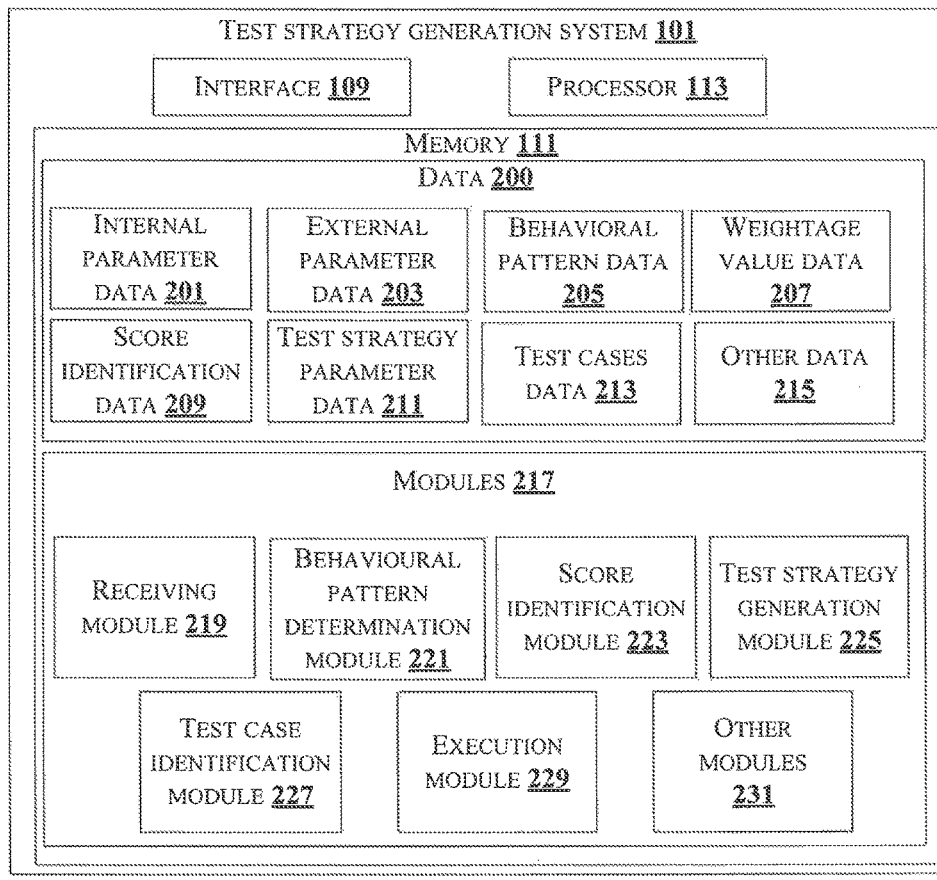
FIG. 2a shows a detailed block diagram illustrating a test strategy generation system in accordance with some embodiments of the present disclosure.

FIG. 2a shows a detailed block diagram illustrating a test strategy generation system in accordance with some embodiments of the present disclosure.

In the illustrated FIG. 2, the one or more data 200 and the one or more modules 217 stored in the memory 111 are described herein in detail. In an embodiment, the data 200 includes internal parameters data 201, external parameters data 203, behavioural pattern data 205, weightage value data 207, score identification data 209, test strategy parameters data 211, test cases data 213 and other data 215 for generating a test strategy for a software application.

The internal parameters data 201 comprises details about the various parameters used for testing the software application which includes data associated with application specific requirement parameters, test parameters and user defined input parameters. A person skilled in the art would understand that any other information related to the software application can be included in the internal parameters data 201. The different components in the software application being tested, and the associated specific requirements which are modified during a specific release of the software is a key input data for the internal parameter data 201. Further, the internal parameters data 201 includes the test parameters which specify the type of release, number of test execution cycle, credentials for connecting to the test management system 105 etc. The internal parameters data 201 further comprises a user defined input parameters which are considered for determining the test strategy. The user defined parameters can include for example risk levels, past failure data associated with a software application etc. In an exemplary embodiment, the test strategy generation system 101 can include maximum of five user defined parameters which are mutually exclusive.

The external parameters data 203 comprises data received from the external data sources 103 which include user behavioural parameters, technology related parameters and time specific parameters. A person skilled in the art would understand that any other information related to the external parameters gathered from external data sources 103 can be included in the external parameters data 203. The external parameter data 203 are the key inputs for the behavioural pattern analysis. The external parameters data 203 are received from various data feeds, reports analysts etc. The behavioural parameters include user experiences in executing the application. The behavioural parameters include various data feeds on various parameters for example type of device used by users for the application. Further, the external parameters data 203 includes technology related parameters which provides information on the technology aspects and the most emerging technologies in the market for the plurality of applications. The external parameters data 203 further includes time specific parameters which provide data about the users requirements and preferences for an application during a specific period of time. In an embodiment, the external parameters data 203 includes data feeds on type of device used by users, sequence of buying patterns followed by users etc.

The behavioural pattern data 205 comprises details about the behavioural patterns assigned for the plurality of the external parameters. The behavioural pattern data 205 are provided by analysing the external parameters data 203 received from the external data sources. For example, if the external parameters is a data on the purchase pattern of a particular type or brand of products in terms of popularity within the user, the purchase pattern data is analysed by the test strategy generation system 101 and a behavioural pattern is generated based on the purchase pattern data.

The weightage value data 207 comprises the weightage value assigned for the plurality of parameters of the external data sources. The weightage value data 207 further comprises a threshold weightage value for the plurality of parameters which is defined by the user or pre-defined in the test strategy generation system 101. The threshold weightage value is the highest value for a particular parameter set by the users or pre-defined by the test strategy generation system 101.

The score identification data 209 comprises the score identified for the plurality of parameters which are received from the external data sources. The score for the plurality of parameters is identified based on the generated behavioural pattern. The score identification data 209 for the plurality of parameter is a numerical value assigned for each of the parameters based on the weightage assigned and behavioural pattern of the plurality of parameters.

The test strategy parameters data 211 comprises the test strategy parameters for the software application under test. In an embodiment, the test strategy parameters includes the test cases to be executed, number of users to be executed, type of device used for execution, and sequence of steps followed by the users in executing an application. The test strategy parameters data 211 helps in selecting the set of test cases for the plurality of parameters for a software application.

The test cases data 213 comprises the set of test cases to be executed for testing a software application under test. The test cases data 213 comprises the set of test cases for the plurality of parameters from the test management system 105 based on the test parameters strategy.

The other data 215 may store data, including temporary data and temporary files, generated by modules for performing the various functions of the test strategy generation system 101.

In an embodiment, the one or more data 200 in the memory 111 are processed by the one or more modules 217 of the test strategy generation system 101. The one or more modules 217 may be stored within the memory 111 as shown in FIG. 2a. In an example, the one or more modules 217, communicatively coupled to the processor 113, may also be present outside the memory 111 and implemented as hardware. As used herein, the term module refers to an application specific integrated circuit (ASIC), an electronic circuit, a processor 113 (shared, dedicated, or group) and memory that execute one or more software or firmware programs, a combinational logic circuit, and/or other suitable components that provide the described functionality.

Figure 2B:
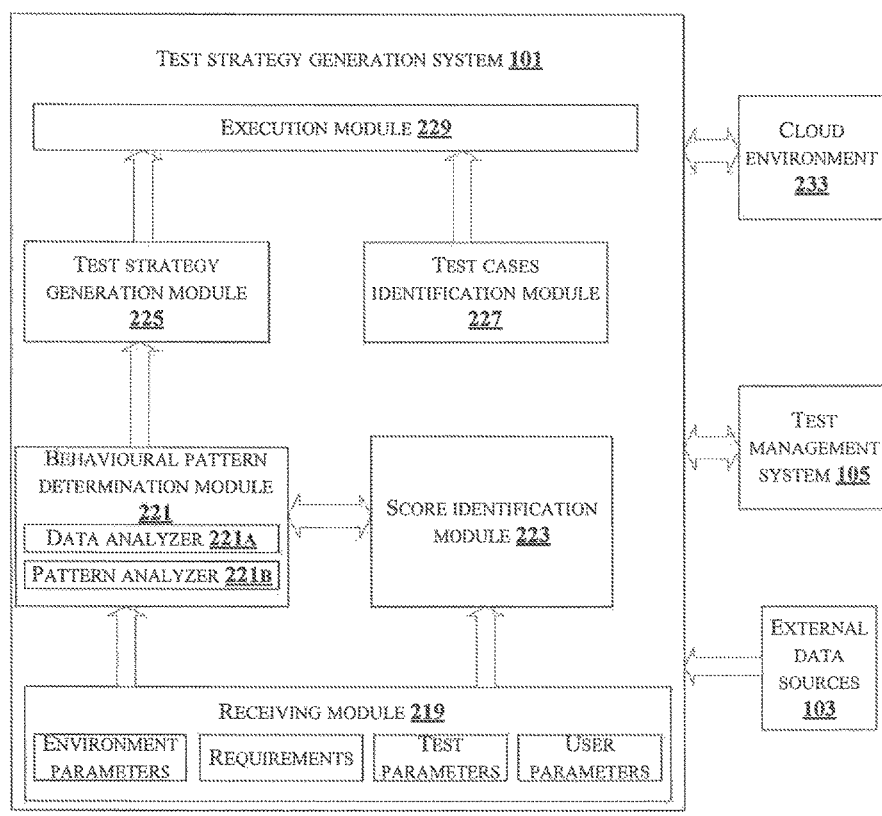
FIG. 2b shows architecture of a test strategy generation system in accordance with some embodiments of the present disclosure.

In one implementation, the one or more modules 217 may include, for example, a receiving module 219, a behavioural pattern determination module 221, a score identification module 223, a test strategy generation module 225, a test case identification module 227 and an execution module 229. The interconnection of the modules and the flow of data between the modules is illustrated in FIG. 2b which shows an overall architecture of the test strategy generation system 101.

The memory 111 may also comprise other modules 231 to perform various miscellaneous functionalities of the test strategy generation system 101. It will be appreciated that such aforementioned modules may be represented as a single module or a combination of different modules.

The receiving module 219 receives internal and external parameters from the internal and external data sources 103 respectively. The external parameters comprise environment parameters which are associated with the data from external data feeds like user buying patterns, usage data etc. The internal parameters include requirements, test parameters and user parameters etc. The requirement parameters are associated with an application under test, the modification required for a particular release etc. The test parameters includes the number of test execution cycle, type of release etc. The user parameters provide user defined inputs that needs to be considered for a test strategy. Further, the test strategy generation system 101 is scalable to include multiple user parameters. The receiving module 219 also receives the set of test cases for the plurality of parameters from the test management system 105 based on the test strategy parameters.

The behavioural pattern determination module 221 determines behavioural patterns for the plurality of parameters of the external data sources. The behavioural pattern is a key input in generating an efficient test strategy for the software application. The behavioural pattern determination module 221 receives the external parameters data 203 from the receiving module 219 and converts the external parameters data 203 into a standard format. The behavioural pattern determination module 221 further determines one or more behavioural patterns for the plurality of external parameters. For example, if the external parameter from the external data sources 103 provides the sequence of buying pattern of a particular type of product in an E-commerce application, the behavioural pattern determination module 221 determines the behavioural patterns in terms of test configurations inputs to be generated to test the E-commerce application. In an exemplary embodiment, the behavioural pattern determination module 221 comprises two units namely data analyser 221A and pattern analyser 221B. The data analyser 221A receives the plurality of external and internal parameters from the receiving module and sends the external parameters to pattern analyser 221B. The data analyser 221A sends the internal parameters to score identification module 223. The pattern analyser 221B further processes the plurality of external parameters and determines one or more behavioural patterns for the plurality of external parameters.

The score identification module 223 is configured to identify a score for the plurality of parameters of external data sources. The scores for each of the plurality of parameters of external data sources 103 are identified based on the corresponding behavioural patterns and the weightage value assigned for the plurality of parameters. Table 1 below shows a sample illustration for identification of scores.

TABLE 1

| Category | Parameter | Usage (number of users) | Parameter score |
|---|---|---|---|
| Usage | Mobile device | 1000 | 1000 |
| Usage | PC | 750 | 750 |
| Browser | Chrome | 300 | 300 |
| Browser | IE | 200 | 200 |
| Browser | Firefox | 250 | 250 |
| Browser | Safari | 175 | 175 |
| Transaction volume | Volume of transaction for checkout of item during thanksgiving | 100000 | 100000 |
| Transaction volume | Volume of transaction in normal days | 15000 | 15000 |

The above table shows an example for identification of score for the various parameters defined in an E-commerce application. The different external parameters from various data feeds includes e usage of the application for execution by the user, time specific parameters such as volume of transaction category, type of browser used for execution. Each category is further categorized into a parameter, for example the usage category is divided into the type of device used by the users like mobile device, PC etc. The score is identified based on the user defined input such as equal to the usage, percentage of usage etc. In the above table, the score is given a value equal to the usage that is the number of users for the associated parameter. In an embodiment, Table 2 shows a sample illustration for buying pattern score. In the below table, a score for the buying pattern parameter is identified based on the user defined input, wherein the score is a number sequence of the item bought by the user (such as 1, 3, 8, 9) where 1, 3, 8, 9 indicate the item identifiers.

TABLE 2

| Category | Parameter | Sequence of buying pattern | Score |
|---|---|---|---|
| Sequence | Buying pattern | Item 1−>item 3−>item 8−>item 9 | 1, 3, 8, 9 |

The test strategy generation module 225 is configured to generate a test strategy based on the score identified for the plurality of parameters. The score for the plurality of parameters are aggregated by the test strategy generation module 225. For example, suppose one of the parameter is type of browser used by the user such as IE, chrome, safari etc. The score for browser IF and chrome which are supported on the same platform windows gets aggregated and reported as windows browsers and the score for safari browser gets collected as Mac® browsers. The test strategy generation module 225 further determines the threshold weightages assigned by the users or by the test generation system. The test strategy generation module 225 further compares the aggregated score for the plurality of parameters with the threshold weightage and determines test strategy parameters based on the comparison. The Table 3 below shows a sample illustration for threshold weightage and score value. In the table below, a weightage of 60% is assigned which implies that, if the number of users who access the E-commerce application through mobile device is more than the 60% of the total number of the users, the test strategy parameters includes testing the E-commerce application on the mobile device. Similarly, as shown in Table 3, the usage of the application during a holiday season indicates the transaction volume for holiday readiness, using which the load required to be simulated is fed into the test strategy. Further, in the Table 3, the sequence parameter followed by a user in making a purchase such as adding item a to a shopping cart, adding item b to a wish list, performing a checkout using specific type of cart and order a particular type of delivery are all recorded and a test strategy based on these scenario is generated.

TABLE 3

| Category | Parameter | Threshold | Parameter score |
|---|---|---|---|
| Usage | Mobile device | 60% | 0.6 |
| Usage | PC | 40% | 0.4 |
| Browser | Chrome | 100% | 1.0 |
| Browser | IE | 60% | 0.6 |
| Browser | Firefox | 60% | 0.6 |
| Browser | Safari | 60% | 0.6 |
| Transaction volume | Volume of transaction for checkout of item during thanksgiving | 10,000 | 10,000 |
| Transaction volume | Volume of transaction in normal days | 1000 | 1000 |
| Sequence | Buying pattern | — | 1, 3, 8, 9 |

The test case identification module 227 is configured to identify a set of test cases for the plurality of parameters. The test case identification module 227 identifies the set of test cases based on the test strategy parameters. The test case identification module 227 receives the set of test cases from the test management system 105 which contains a set of test cases for the plurality of parameters. The Table 4 below shows a sample illustrating the test strategy parameter. As shown in the below Table 4, if the number of users accessing the E-commerce application through mobile device is greater than that of PC, higher number of test cases specific to the mobile devices are taken up for the E-commerce application from the test management system 105. Thus for each of the parameters, a specific set of parameters are picked depending on the test parameter strategy and the corresponding score for each.

TABLE 4

| Category | Parameter | Score | Test strategy parameter |
| --- | --- | --- | --- |
| Usage | Mobile device | 0.6 | 60% of test cases to be picked up |
| Usage | PC | 0.4 | 40% of test cases to be picked up |
| Browser | Chrome | 1 | Test to be run only on chrome |
| Browser | IE | — | |
| Browser | Firefox | — | |
| Browser | Safari | — | |
| Transaction volume | Volume of transaction for checkout of item during thanksgiving | 100000 | Volume of transaction >100000 |
| Transaction volume | Volume of transaction in normal days | 10000 | Volume of transaction >10000 |
| Sequence | Buying pattern | 1, 3, 8, 9 | Test scenario in strategy 1, 3, 8, 9 |

The execution module 229 is configured to execute the identified set of test cases for the plurality of parameters in a specific environment. The execution module 229 further selects the environment in which the execution has to be done based on the test strategy parameters. Generally, in software industries, an application to be tested is hosted in a cloud environment. In an exemplary embodiment, the execution module 229 connects with the cloud environments as shown in FIG. 2b to trigger automated text execution of the set of cases generated by the test cases identification module 227. The test execution module 229 further uploads the result of the execution to the test management system 105.

Figure 3:
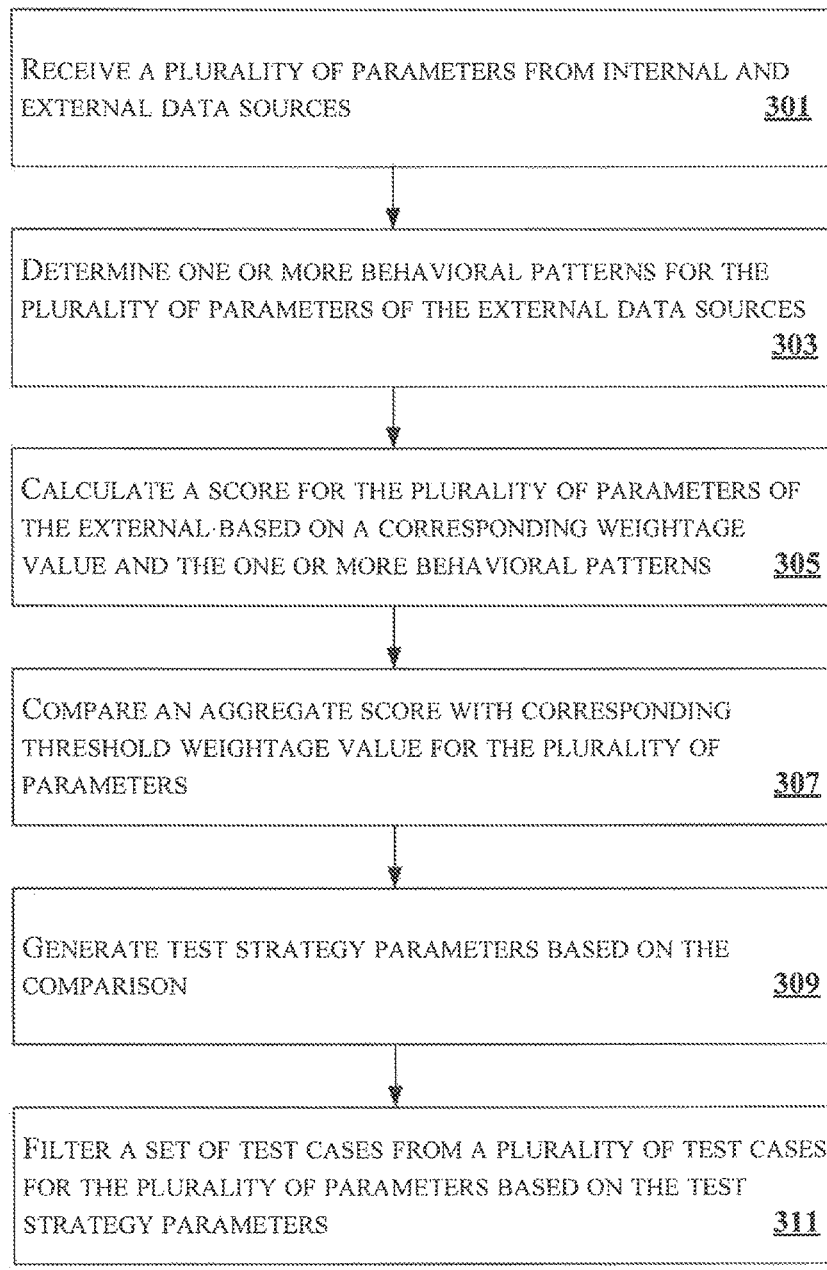
FIG. 3 illustrates a flowchart showing a method for generating test strategy for a software application in accordance with some embodiments of present disclosure.

FIG. 3 illustrates a flowchart showing a method for generating test strategy for a software application in accordance with some embodiments of present disclosure.

As illustrated in FIG. 3, the method 300 comprises one or more blocks for generating a test strategy for a software application. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

A software application is developed based on the user defined inputs and further tested to determine any defects in the developed application. The test strategy generation system 101, in addition to the internal parameters, also receives external parameters for generating an efficient test strategy for the software application.

At block 301, receive, by the test strategy generation system, plurality of parameters from internal and external data sources.

At block 303, determine, by the test strategy generation system, one or more behavioural patterns for the plurality of parameters of the external data sources.

At block 305, calculate, by the test strategy generation system, a score for the plurality of parameters of the external data sources 103 based on the one or more behavioural patterns and a weightage.

At block 307, compare, by the test strategy generation system, an aggregate score with corresponding threshold weightage value for the plurality of parameters, wherein the aggregate score is calculated based on the score for the plurality of parameters.

At block 309, generate, by the test strategy generation system, test strategy parameters based on the comparison.

At block 311, filter, by the test strategy generation system, a set of test cases for the plurality of parameters from the plurality of test cases based on the test strategy parameters.

Figure 4:
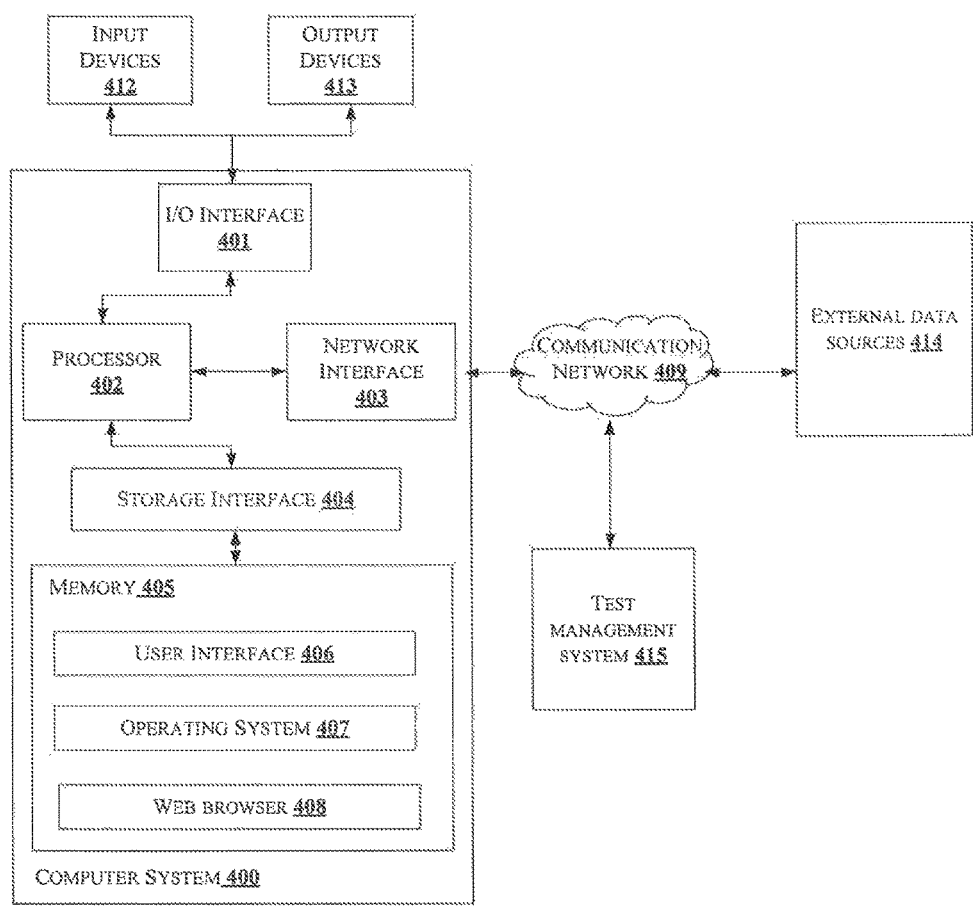
FIG. 4 illustrates a block diagram of an exemplary computer system for implementing embodiments consistent with the present disclosure.

FIG. 4 illustrates a block diagram of an exemplary computer system for implementing embodiments consistent with the present disclosure.

Computing System

FIG. 4 illustrates a block diagram of an exemplary computer system 400 for implementing embodiments consistent with the present disclosure. In an embodiment, the computer system 400 is used to implement the test strategy generation system. The computer system 400 may comprise a central processing unit ("CPU" or "processor") 402. The processor 402 may comprise at least one data processor for generating a test strategy for a software application. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 consists of a test strategy generation system. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with the external data sources 414 and test management system 415. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 3) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, web server 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages of the Embodiment of the Present Disclosure are Illustrated Herein

An embodiment of the present disclosure generates an optimized test strategy for a software application under test by covering non-deterministic data as one of the factors.

The present disclosure provides efficiency by covering higher actual test scenarios and also adds behavioural learning in the testing process.

An embodiment of the present disclosure provides the right set of test cases for the plurality of parameters wherein the test cases are identified based on the users behaviour towards the application under test.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of, the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Test strategy generation system |
| 103 | External data sources |
| 105 | Test management system |
| 107 | Communication network |
| 109 | I/O interface |
| 111 | Memory |
| 113 | Processor |
| 200 | Data |
| 201 | Internal parameters data |
| 203 | External parameters data |
| 205 | Behavioural pattern data |
| 207 | Weightage value data |
| 209 | Score identification data |
| 211 | Test strategy parameter data |
| 213 | Test cases data |
| 215 | Other data |
| 217 | Modules |
| 219 | Receiving module |
| 221 | Behavioural pattern determination module |
| 221A | Data analyser |
| 221B | Pattern analyser |
| 223 | Score identification module |
| 225 | Test strategy generation module |
| 227 | Test cases Identification module |
| 229 | Execution module |
| 231 | Other modules |

We claim:

1. A method for generating test strategy for a software application, the method comprising:

receiving, by a test strategy generation system, a plurality of parameters from internal data sources and external data sources, wherein the plurality of parameters associated with internal data source comprises application specific requirement parameters, test parameters and user defined input parameters;

determining, by the test strategy generation system, one or more behavioural patterns for the plurality of parameters of the external data sources;

calculating, by the test strategy generation system, a score for the plurality of parameters of the external data sources and the internal data sources based on the one or more behavioural patterns and a weightage; comparing, by the test strategy generation system, an aggregate score with corresponding threshold weightage value for the plurality of parameters, wherein the aggregate score is calculated based on the score for the plurality of parameters;

generating, by the test strategy generation system, test strategy parameters that comprise a number of test cases to be executed on the software application, a number of users accessing the software application, a type of device used for accessing the software application, and a sequence of steps followed by the users in executing the software application based on the comparison; and filtering, by the test strategy generation system, a set of test cases from a plurality of test cases for the plurality of parameters based on the test strategy parameters.

2. The method as claimed in claim 1, wherein the plurality of parameters associated with external data sources comprises user behavioural parameters, technology related parameters and time specific parameters.

3. The method as claimed in claim 1, wherein the threshold value for the plurality of parameters is defined by a user.

4. A test strategy generation system for generating test strategy for a software application, comprising:
a processor; and
a memory communicatively coupled to the processor, wherein the memory stores processor instructions, which, on execution, causes the processor to:
receive a plurality of parameters from internal data sources and external data sources, wherein the plurality of parameters associated with internal data sources comprises application specific requirement parameters; test parameters and user defined input parameters;
determine one or more behavioural patterns for the plurality of parameters of the external data sources;
calculate a score for the plurality of parameters of the external data sources and the internal data sources based on the one or more behavioural patterns and a weightage;
compare an aggregate score with corresponding threshold weightage value for the plurality of parameters, wherein the aggregate score is calculated based on the score for the plurality of parameters;
generate test strategy parameters that comprise a number of test cases to be executed on the software application, a number of users accessing the software application, a type of device used for accessing the software application, and a sequence of steps followed by the users in executing the software application based on the comparison; and filter a set of test cases from a plurality of test cases for the plurality of parameters based on the test strategy parameters.

5. The test strategy generation system as claimed in claim 4, wherein the plurality of parameters associated with external data sources comprises user behavioural parameters, technology related parameters and time specific parameters.

6. The test strategy generation system as claimed in claim 4, herein the processor receives a threshold value for the plurality of parameters by a user.

7. A non-transitory computer readable medium including instruction stored thereon that when processed by at least one processor cause a test strategy generation system to perform operation comprising:
receiving a plurality of parameters from internal data sources and external data sources, wherein the plurality of parameters associated with internal data SOURCES COMPRISES APPLICATION SPECIFIC REQUIREMENT parameters, test parameters and user defined input parameters;
determining one or more behavioural patterns for the plurality of parameters of the external data sources;
calculating a score for the plurality of parameters of the external data sources and the internal data sources based on the one or more behavioural patterns and a weightage;
comparing, by the test strategy generation system, an aggregate score with corresponding threshold weightage value for the plurality of parameters, wherein the aggregate score is calculated based on the score for the plurality of parameters;
generating test strategy parameters that comprise a number of test cases to be executed on the software application, a number of users accessing the software application, a type of device used for accessing the software application, and a sequence of steps followed by the users in executing the software application based on the comparison; and
filtering a set of test cases from a plurality of test cases for the plurality of parameters based on the test strategy parameters.

8. The medium as claimed in claim 7, wherein the plurality of parameters associated with external data sources comprises user behavioural parameters, technology related parameters and time specific parameters.

9. The medium as claimed in claim 7, wherein the instruction causes the processor to receive a threshold value for the plurality of parameters from a user.

* * * * *